W. L. FISH.
Gas Stove.
No. 37,745.
2 Sheets—Sheet 1.
Patented Feb. 24, 1863.
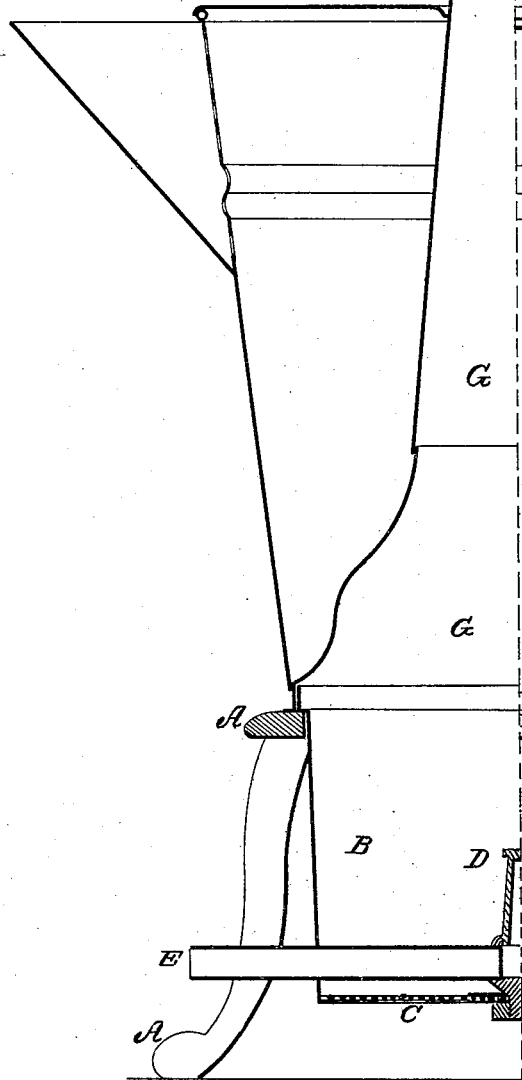
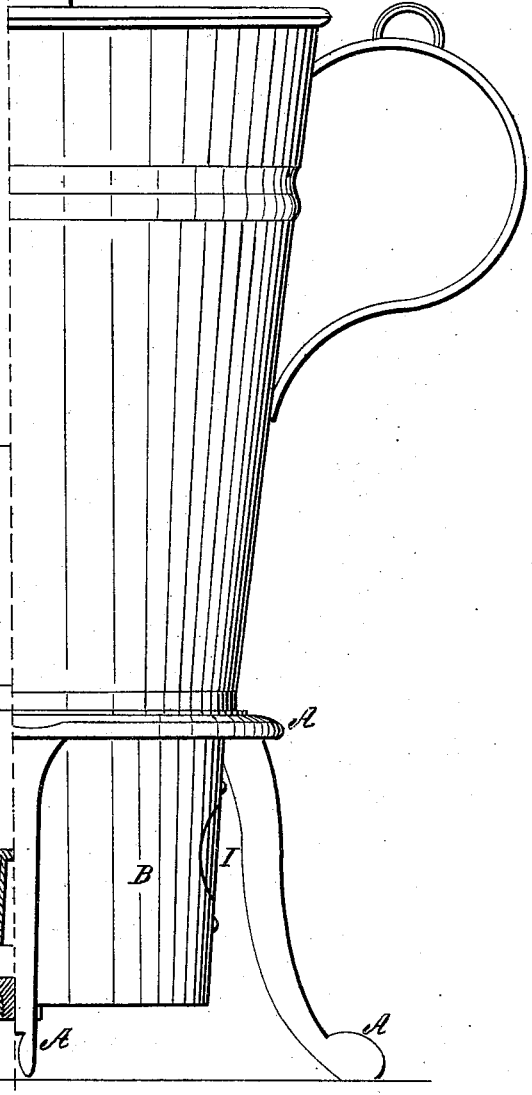

W. L. FISH.
Gas Stove.
No. 37,745.
2 Sheets—Sheet 2.
Patented Feb. 24, 1863.
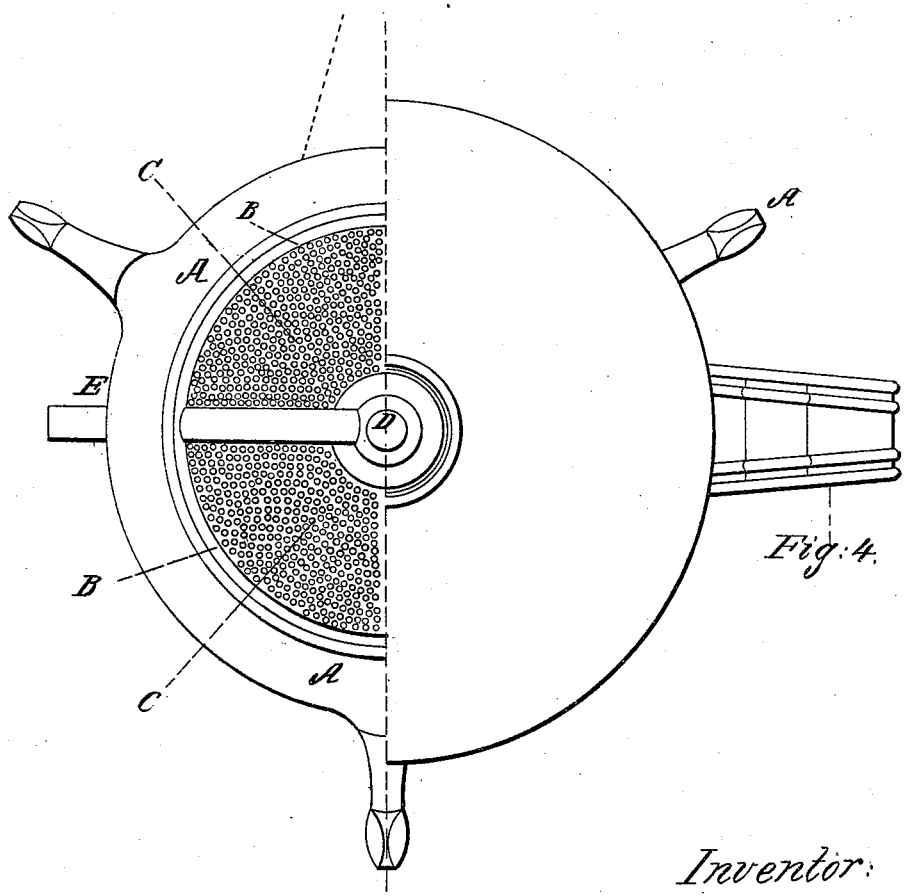

UNITED STATES PATENT OFFICE.

WARREN L. FISH, OF NEWARK, NEW JERSEY.

IMPROVEMENT IN APPARATUS FOR COOKING WITH GAS.

Specification forming part of Letters Patent No. 37,745, dated February 24, 1863.

*To all whom it may concern:*

Be it known that I, WARREN L. FISH, of Newark, in the county of Essex and State of New Jersey, have invented certain new and useful improvements in apparatus for heating or boiling liquids and cooking food by gas, applicable also as a night-lamp; and I hereby declare that the following is a full, clear, and exact description of the same, reference being had to the accompanying drawings, which form part of this specification.

Gas has heretofore been used for heating and cooking purposes. In gas cooking-stoves and other apparatus of similar nature it was hitherto deemed indispensable to mechanically separate or eliminate from the flame the carbon in suspension. For this purpose fine perforated gas-pipes arranged horizontally in coils or bars have been used, through which gas was allowed to issue in so minute jets as to burn with a dull or blue flame. Wire-gauze diaphragms were also for this purpose interposed between the flame and the support of the vessel to be heated. In this diaphragm, which was highly heated, the carbon was retained and perfectly consumed. Air was also mixed with gas to increase the volume of heated-fluid, and thus the more economically to use gas for heating purposes.

The gas apparatus subject of this application is constructed on a different principle. My improved apparatus is so constructed as that a large number of fine currents of atmospheric air are caused to stream through the medium in which the flame or flames are confined, whereby the said air becomes highly heated, and, intermingling with the gas, completely consumes the carbon it holds in suspension; and my invention consists, first, in a new gas heating and cooking apparatus, consisting, essentially, in the combination of a cylinder or its equivalent, closed at the bottom by a perforated plate and surrounding one or more jets of gas, with a chimney, arranged to operate substantially in the manner and for the purposes hereinafter set forth; secondly, in the combination, with the cylinder surrounding the flame or flames, perforated bottom, and chimney, of the making of the said cylinder of a transparent material or providing it with one or more windows, substantially in the manner and for the purposes hereinafter set forth; thirdly, in the combination, with the cylinder surrounding one or more flames and closed at the bottom by a perforated plate, of a heating-vessel with a central flue so shaped as to constitute the chimney, to operate substantially as and for the purposes hereinafter set forth.

To enable others to make and use my invention, I shall now describe its construction and operation, referring to the accompanying drawings, in which—

Figures 1 and 2 are views of my improved apparatus, partly in vertical section through the axis and partly in elevation. Figs. 3 and 4 are plan views of the same, partly with and partly without a heating-vessel.

A in the said drawings is a stand composed of a ring, to which are attached three legs. In lieu of the leg, the ring may be secured to a bracket, which may be hung in a suitable socket fast in the wall. The ring forms the support of a cylinder, B, the bottom of which is closed by a finely-perforated plate, *c*. Within this cylinder I arrange a burner, D. This may be permanently fixed to the cylinder, as shown in the drawings, with a stem, E, on the outside thereof for connection with an ordinary burner by means of a rubber or other gas-tube; or it may be inserted from the under side or bottom, as the case may be, when used in connection with a bracket, and I so arrange the latter as that the ring may be swung just above the burner. The cylinder, which has a central orifice, is then placed in the ring, so that the burner passes through the said orifice and acquires the position shown in the drawings. A chimney, G, surmounts the cylinder and snugly fits its border. This chimney may be surrounded by a cylindrical or conical vessel, to contain liquids to be heated, and the cover of which may be used to support a stand, upon which the plate or other vessel to be heated may be placed; or an independent support may be arranged to hold the said vessel over the chimney or flue.

The cylinder B may be made of some transparent material—such as glass or mica—the illuminating-power of the flame not being destroyed by the adaptation of the principle of my invention to gas-heaters. Light may thus be derived from the flame while used for heating purposes. If the cylinder be made of an opaque substance—such as sheet iron or—brass—when orifices or windows I may be cut therein, which may be lined with mica.

The operation of this apparatus is as follows: Connection being established between the apparatus and any ordinary gas burner or tube, in the manner hereinbefore referred to, the burner in the cylinder is lighted, and the chimney with or without the vessel is placed upon it. The draft created by the chimney will force the air to stream up and through the orifices in the bottom of the cylinder, and will pass into and through the inclosure of the flame. The currents of air thus drawn through the flame will commingle therewith and become intensely heated, furnishing oxygen for the complete combustion of the particles of carbon in suspension in the gas. Aerated gas is thus produced and highly-heated air is passed up and through the chimney. The liquid in the vessel surrounding the chimney will be heated in a very short time, and the largest amount of heat generated will be received against the plate, vessel, &c., facing the orifice of the flue.

Having thus fully described my invention, I shall state my claims, as follows:

1. The herein described gas heating and cooking apparatus, the same consisting, essentially, in the combination of a cylinder, or its equivalent, closed at the bottom by a perforated plate, and surrounding one or more jets of gas, as shown, with a chimney arranged to operate substantially in the manner and for the purposes set forth.

2. In combination with the cylinder surrounding the flame or flames, perforated bottom, and chimney, the making of the said cylinder of a transparent material, or providing it with one or more windows, substantially in the manner and for the purposes set forth.

3. In combination with the cylinder surrounding one or more flames, and closed at the bottom by a perforated plate, as described, a heating-vessel with a central flue, so shaped as to constitute the chimney, to operate substantially as and for the purposes set forth.

In testimony whereof I have signed my name to this specification before two subscribing witnesses.

WARREN L. FISH.

Witnesses:
O. R. SMITH,
G. SANDFORD.